(12) United States Patent
Hall

(10) Patent No.: US 9,874,656 B2
(45) Date of Patent: Jan. 23, 2018

(54) HARMONIZED INTELLIGENT MODELER

(71) Applicant: Dassault Systemes Canada Inc., Montreal (CA)

(72) Inventor: Duncan John Hall, Morley (AU)

(73) Assignee: Dassault Systemes Canada Inc., Montreal (CA)

( * ) Notice: Subject to any disclaimer, the term of this patent is extended or adjusted under 35 U.S.C. 154(b) by 245 days.

(21) Appl. No.: 14/573,671

(22) Filed: Dec. 17, 2014

(65) Prior Publication Data

US 2016/0178797 A1    Jun. 23, 2016

(51) Int. Cl.
| | |
|---|---|
| *G06T 17/00* | (2006.01) |
| *G01V 99/00* | (2009.01) |
| *G01V 9/00* | (2006.01) |
| *G06F 17/18* | (2006.01) |

(52) U.S. Cl.
CPC ............ *G01V 99/005* (2013.01); *G01V 9/00* (2013.01); *G06F 17/18* (2013.01); *G06T 17/00* (2013.01)

(58) Field of Classification Search
None
See application file for complete search history.

(56) References Cited

U.S. PATENT DOCUMENTS

| | | | | |
|---|---|---|---|---|
| 2007/0115282 A1* | 5/2007 | Turner | ............... | G06T 15/08 345/424 |
| 2012/0179635 A1 | 7/2012 | Vasudevan | | |
| 2014/0006074 A1* | 1/2014 | Cockburn | ............ | E02F 9/2054 705/7.11 |

OTHER PUBLICATIONS

Zhao et al., 3D Modeling of Open Pit Based on AutoCAD and Application, 2011, Procedia Earth and Planetary Science 3, pp. 258-265.*

Boström, et al., "On the Definition of Information Fusion as a Field of Research", *School of Humanities and Informatics*, University of Skövde, http://www.isif.org/sites/isif.org/files/FULLTEXT01.pdf, (8 pages) (2007).

Elbrond, J., "Economic Effect of Ore Loss and Rock Dilution", from *MineDesignWiki—Collaborating to create mining best practice*, CIM, vol. 87, No. 978, https://www.minewiki.org/index.php/Economic_Effect_of_Ore_Loss_and_Rock_Dilution, (11 pages) (2011).

Hamrin, H., "Underground Mining Methods and Applications", Atlas Copco, Stockholm, Sweden, http://www.ct.ufrgs.br/laprom/Underground%20Mining%20Methods.pdf, pp. 3-14. (1980).

(Continued)

*Primary Examiner* — Frank Chen
(74) *Attorney, Agent, or Firm* — Hamilton, Brook, Smith & Reynolds, P.C.

(57) ABSTRACT

Embodiments provide methods and systems for modeling a proposed geological volume. One such embodiment begins by digitally creating a three-dimensional (3D) model of a geological volume that includes one or more variables, each of which is a mathematical factor in an analysis confidence of one or more sub-volumes of the volume. Next, standardized values for each of the one or more variables are defined. In turn, the analysis confidence, e.g. mined, ore quality, etc., of the one or more sub-volumes is mathematically determined. Finally, the model is updated to include the determined analysis confidence of the one or more sub-volumes.

19 Claims, 17 Drawing Sheets
(13 of 17 Drawing Sheet(s) Filed in Color)

(56) References Cited

OTHER PUBLICATIONS

Koks, D. and Challa, S., "An Introduction to Bayesian and Dempster-Shafer Data Fusion", *Defence Science & Technology*, DSTO-TR-1436, http://www.dsto.defence.gov.au/publications/2563/DSTO-TR-1436.pdf, (49 pages) (Jul. 2003).

Villaescusa, E., "Quantifying open stope performance", *Western Australian School of Mines*, PMB 22 Kalgoorlie 6430 Australia, http://rockmechanics.curtin.edu.au/local/docs/StopePerformanceVillaescusa04.pdf, (10 pages) (2004).

European Search Report for EP 15 19 9432 dated Apr. 14, 2016 entitled "Harmonized Intelligent Modeler".

Fallara, F., et al., "3-D Integrated Geological Modeling in the Abitibi Subprovince (Quebec, Canada): Techniques and Applications" Exploration and Mining Geology, vol. 15, No. 1-2, Jan. 1, 2006.

Carranza, Emmanuel, J.M., "From Predictive Mapping of Mineral Prospectivity to Quantitative Estimation of Number of Undiscovered Prospects" Resource Geology, vol. 61, No. 1, Dec. 22, 2010.

Sprague, K., et al., "Spatial Targeting using Querics in 3-D GIS Environment with Application to Mineral Exploration", Computers and Geosciences, Pergamon Press, Oxford, GB, vol. 32, No. 3, Apr. 1, 2006.

\* cited by examiner

Sample report 550

| Stope name: | 2270 North 1 | | | | | |
|---|---|---|---|---|---|---|
| Status: | Drilled | | | | | |
| Material type: | ore | | | | | |
| Confidence band | Tonnes (t) | Cumulative tonnes (t) | Grade (gr/tonne) | Contained metal (grammes) | Cumulative metal (grammes) |
| 80-100 | 7450 | 7450 | 4.6 | 34270 | 34270 |
| 60-80 | 825 | 8275 | 3.8 | 3135 | 37405 |
| 40-60 | 600 | 8875 | 1.5 | 900 | 38305 |
| 20-40 | 400 | 9275 | 0.75 | 300 | 38605 |
| 0-20 | 200 | 9475 | 0.25 | 50 | 38655 |

HARMONIZED INTELLIGENT MODELER

BACKGROUND OF THE INVENTION

The invention generally relates to the field of computer programs and systems, and specifically to the field of computer aided design (CAD), computer-aided engineering (CAE), modeling, geology mine planning (GMP), and simulation.

GMP systems provide for the modeling, design, and simulation of geological and natural resources. GMP systems provide a representation of data objects and their attributes using points, edges, and/or lines, and in certain cases with faces. Additionally, GMP programs may employ relational databases for the storage of spatial and attribute information as well as volumetric spatial data models, such as voxel based block models.

GMP systems and GMP generated models can be employed to perform simulations of real-world objects and systems. For example, GMP systems and models can be leveraged to simulate underground mining methods, including sub-level open stoping and sub-level caving, which are further described at http://www.ct.ufrgs.br/laprom/Underground%20Mining %20Methods.pdf, the contents of which are herein incorporated by reference. Existing simulation systems typically rely upon the input of a single user. Thus, in the event where several roles exist, each role performs his or her own simulation. There are various roles and responsibilities in mining operations, thus, disparate simulations are performed, some of which are described at http://rockmechanics.curtin.edu.au/local/docs/StopePerformanceVillaescusa04.pdf, the contents of which are herein incorporated by reference. Mining simulation is further complicated because there are typically multiple representations and understandings of the mine and ore deposit between the various roles. Further, for mines and mineral deposits, the measurements of the extent, content, and geometry of the mine and mineral deposit may be constrained by economic and time factors. Moreover, because of the multiple roles there is no single place (in the mine, office, or computer storage) to represent the combined understandings. These separate simulations fail to provide an accurate simulation of the mining project because no role has a complete understanding. This can lead to a simulation that fails to account for the effects of ore loss and dilution and this has a substantial economic effect on the mining project. These economic effects are further described in https://www.minewiki.org/index.php/Economic_Effect_of_Ore_Loss_and_Rock_Dilution, the contents of which are herein incorporated by reference.

SUMMARY OF THE INVENTION

Thus, embodiments of the present invention provide improved methods and systems for modeling a proposed geological volume. Embodiments provide a way to represent the combined understanding of the various roles and to establish a unified expression of mining confidence by way of confidence intervals expressed for mined mass and grade. Further, embodiments provide a way to test the contribution of each of the contributing factors in the mined confidence. Embodiments apply principles from expert systems, specifically, data fusion, inference, evidence analysis, predictive modeling, generalized linear models, and 3D spatial modeling to simulate underground and open cast mining. Further, embodiments can be used in the field of natural resource management, for example, to model deposit quality and contamination.

An embodiment of the invention is directed to a computer implemented method for modeling a proposed geological volume. Such an embodiment includes digitally creating a three-dimensional (3D) model of the geological volume that includes one or more variables, each of which is a mathematical factor in an analysis confidence of one or more sub-volumes of the volume to be mined. The method continues by defining standardized values for each of the one or more variables and mathematically determining the analysis confidence of the one or more sub-volumes using the standardized values. The method concludes by automatically updating the model to include the determined analysis confidence of the one or more sub-volumes and generating the updated model on output.

In embodiments of the present invention, the model of the geological volume may represent a stope or an open-pit bench. Another embodiment of the method further comprises assigning respective criteria to each of the one or more variables where the respective criteria express the influence of the corresponding one or more variables on the analysis confidence. Further still, embodiments may comprise assigning a respective weight to the standardized values. The weight indicates an effect of each respective standardized value on the analysis confidence.

According to an embodiment, the analysis confidence is determined using at least one of the Dempster-Shafer Belief Theory, Bayesian probabilistic methods, weights-of-evidence methods, and fuzzy logic methods. Another embodiment further includes testing the contribution of the one or more variables using surveyed spatial deviations and explanatory variables. Said testing results in a mathematical model describing the explanatory potential of the one or more variables. According to such an embodiment, the method may further comprise combining the mathematical model with the updated model so as to permit visual interpretation of deviations for patterns, clustering, regularity, and randomness. Yet another embodiment visually renders the updated model in a manner indicating the determined analysis confidence of the one or more sub-volumes. According to an embodiment of the method, the variables are provided by at least one of a planning engineer, a geotechnical engineer, and a geologist. According to yet another embodiment, the analysis confidence is at least one of a mining confidence and an ore quality confidence. In such an embodiment the mining confidence indicates whether a sub-volume is going to be mined or not and the ore quality confidence indicates characteristics of the sub-volumes such as the purity or contamination levels.

An alternative embodiment of the present invention is directed to a computer-based system for modeling a proposed geological volume. The system, according to an embodiment, comprises a model module executable by one or more processors and configured to create a 3D model of a geological volume that includes one or more variables, each of which is a mathematical factor in an analysis confidence of one or more sub-volumes. In such an embodiment, the model module is communicatively coupled to a data fusion module that is configured to define standardized values for each of the one or more variables. Further, the system includes an inference module that is configured to automatically mathematically determine the analysis confidence of the one or more sub-volumes using the standardized values, responsive to the data fusion module. Additionally, the system includes an update module that is operatively coupled between the model module and the inference module, and that is configured to automatically update the model to include the determined analysis confidence of the one or more sub-volumes and to generate the updated model on output.

In yet another embodiment of the system, the model module is further configured to assign respective criteria, that express the influence of the corresponding one or more variables on the analysis confidence, to each of the one or more variables. According to another embodiment, the model module is further configured to assign respective weights to the standardized values where the weights indicate the effect each respective standardized value has on the analysis confidence.

According to an embodiment of the system, the inference module is configured to determine the analysis confidence using at least one of Dempster-Shafer Belief Theory, Bayesian probabilistic methods, weights-of-evidence methods, and fuzzy logic methods. An embodiment of the system further includes a testing module configured to test the explanatory potential of the one or more variables using surveyed spatial deviations and explanatory variables. The testing performed by the testing module may result in a mathematical model which describes the explanatory potential of the one or more variables.

In another embodiment, the mathematical model determined by the testing module is combined with the updated model generated by the update module, so as to permit visual interpretations of deviations for patterns, clustering, regularity, and randomness via a display device that is operatively coupled to the system. The system may further be configured to visually render the updated model in a manner indicating the determined analysis confidence of the one or more sub-volumes. In an embodiment of the system, the variables are provided by at least one of a planning engineer, a geotechnical engineer, and a geologist.

Another embodiment of the present invention is directed to a cloud computing implementation for modeling a volume. Such an embodiment is directed to a computer program product executed by a server in communication across a network with one or more clients, the computer program product comprising a computer readable medium. The computer readable medium comprises program instructions which, when executed by a processor causes the processor to digitally create a three-dimensional model of a geological volume, the model including one or more variables each of which is a mathematical factor in an analysis confidence of one or more sub-volumes of the volume. The instructions also cause the processor to define standardized values for each of the one or more variables, automatically, mathematically determine the analysis confidence of the one or more sub-volumes using the standardized values, and update the model to include the determined analysis confidence of the one or more sub-volumes. This updating is automatic by the processor, and the processor generates the updated model on output.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5 is a sample report produced by an embodiment.

DETAILED DESCRIPTION OF THE INVENTION

Figure 1:
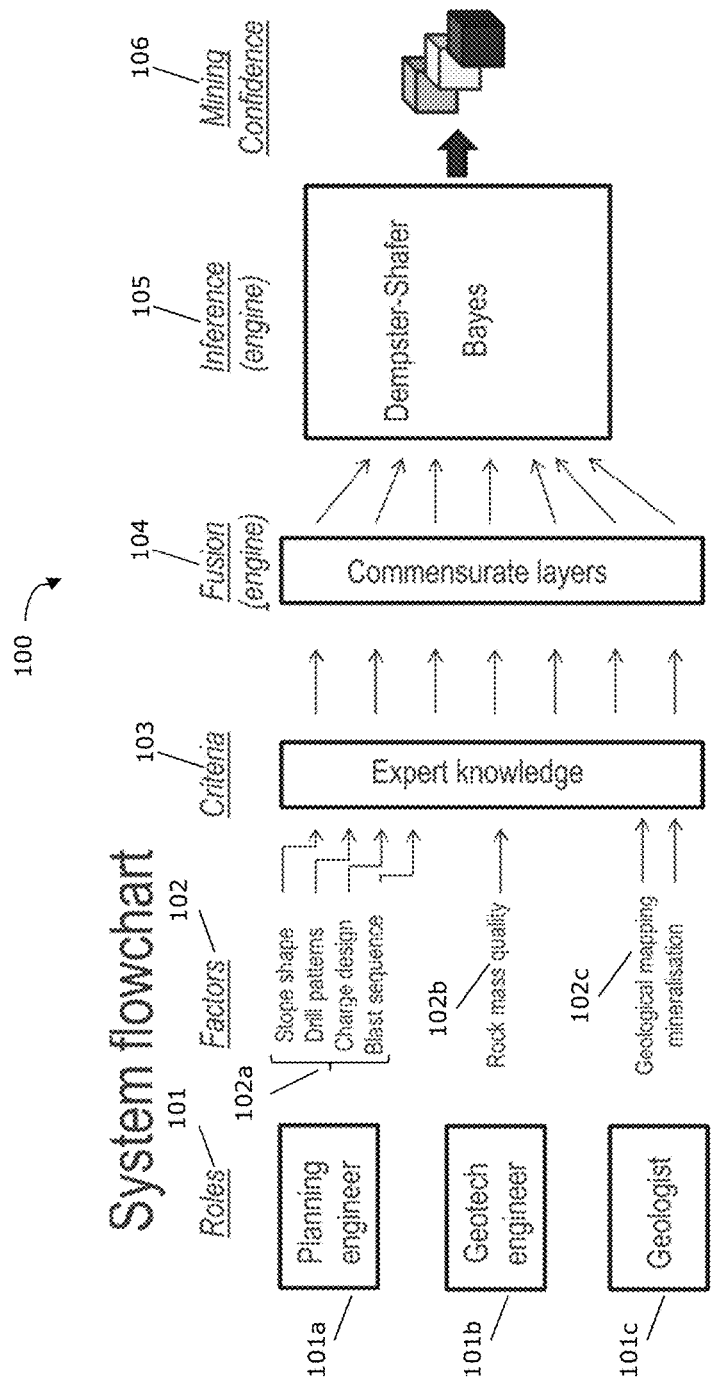
FIG. 1 is a high-level block diagram of a system for implementing an embodiment.

A description of example embodiments of the invention follows.

The teachings of all patents, published applications, and references cited herein are incorporated by reference in their entirety.

Embodiments of the invention are useful in underground mining simulations, e.g., sub-level open stoping and sub-level caving, amongst others. Embodiments may also be used to simulate open pit bench mining. Embodiments may employ methods of data fusion and inference to determine the confidence that a unit of rock will be mined or not mined, based on the evaluation of multiple lines of evidences and criteria. Further, embodiments may determine an expected ore quality of a unit of rock, along with the confidence that it will be mined. Current methods of underground stope design and open pit ore block design are hampered by a number of problems. For example, existing methods are constrained by multiple variables and factors that impact the conformance of the mined stope volume to the original design volume. These multiple factors are spread among various technical areas (engineering, geotechnical, geological), and multiple roles and personnel (planning engineer, geotechnical engineer, geologist). Moreover, the data created by the multiple roles (who are subject matter experts) are in different units of measure and have data value ranges that cannot be readily combined for evaluation.

In addition, the data is not modelled together and not all of the roles/personnel can view the design and the multiple variables in one computer modeling environment where the impact of all of the factors can be modelled holistically.

In current simulations the confidence that a unit of rock will be mined or not mined is not made. Instead if a block is inside the designed stope/ore block volume, it is predicted to be mined and if it is outside of the designed volume it is predicted to be definitely not mined. This is not a valid assumption.

Moreover, design corrections cannot be made with respect to the unified understanding of the factors prior to committing to rock drilling because no unified modeling environment exists. Given that the degree of confidence is not expressed in terms of the mass and grade for the mined ore, the processing plant has sub-standard knowledge of the quality and mass of the mined ore product delivered to the processing plant stockpiles. This can negatively impact production and cost budgeting.

Furthermore, there is no way to test the contribution of the individual variables at a local volumetric level (a small rock unit volume). These variables can only be simulated at the global stope volume level. Thus, there is no way to effectively improve future stope and blast designs based on anything other than global and generalized data. In addition, there is no way to calculate and store the knowledge gained for future stope designs, and there is a lack of a unified stope performance audit system because there is no unified modeling environment or variable testing based on the post-stope survey being tested against the design.

Embodiments of the invention overcome these deficiencies.

FIG. 1 is a system flowchart 100 of a high-level overview of an embodiment of the invention. The system 100 receives input from a variety of roles. In the example embodiment 100, the roles include a planning engineer 101a, geotechnical engineer 101b, and geologist 101c. The various roles 101a-c are non-limiting examples of roles 101 that may provide input to embodiments. Embodiments may receive data from any role relevant to the analysis being performed. The roles 101a-c provide data regarding various factors, i.e. variables, 102a-c that have an effect on the analysis being performed. For example, the embodiment illustrated in FIG. 1 determines a mining confidence 106, thus, the factors 102a (stope shape, drill patterns, charge, design, blast sequence), 102b (rock mass quality), and 102c (geological mapping, mineralization) are relevant to the determination of whether a sub-volume will be mined. The factors 102 are included in a model of the volume to be mined after the factors 102 are received by the system 100. This volume is formed of sub-volumes and as described herein, the factors are relevant to whether a sub-volume will be mined. In an embodiment, the factors 102 may be processed prior to being used in the analysis, for example, to aggregate or de-aggregate similar factors.

Given the factors 102, the roles 101 next assign respective criteria 103, to each of the one or more factors 102. The criteria 103 express the influence of the corresponding variable on the analysis confidence 106. For example, charge powder factor and distance of the sub-volume to the charge are example factors that influence the fragmentation of the rock volume and ultimately the analysis confidence. In this example, the charge powder factor has decreased influence as the distance from the charge increases. The factors 102 and their corresponding criteria 103 are then processed by a fusion engine 104. The fusion engine 104 standardizes the factors 102, thus harmonizing the various factors 102 and their respective criteria 103. The fusion engine 104 may use fusion techniques that are known in art. Further examples of fusion techniques are described herein below. The standardized factors are then processed by the inference engine 105, using techniques such as Dempster-Shafer Belief Theory or Bayesian probabilistic methods, to determine the analysis confidence 106. In the system 100, the analysis may also determine the degree of support and plausibility values for the hypotheses (e.g., mined or not). The degree of support may be calculated subject to inferences derived from the factors 102 and criteria 103 as provided by the role players 101.

The analysis confidence in the example system 100 is a mining confidence 106, i.e., the confidence that sub-volumes will be mined. However, embodiments of the invention are not so limited and may be used to perform various analyses. The system 100 may determine, for units of rock within the stope design or designed ore block, the degree of support (confidence) that the block will be mined or not and the calculation of the plausibility value that the block will be mined or not. For units of rock outside of the stope design or designed ore block, the calculation of degree of support (confidence) that the block will be mined or not, and the calculation of plausibility that the block will be mined or not. The system 100 may also model the ore quality of the sub-volumes. For example, the system 100 may model the concentration of contaminants in sub-volumes. Further, the system 100 may be employed in other natural resource 3D modeling applications, such as soil contamination and pollution.

The system 100 can further test the simulated results. For example, the system 100 may utilize post-mining spatial surveyed results of the mined cavities to determine the accuracy of the analysis confidence 106.

As described herein, embodiments may utilize a variety of variables provided by a variety of role players to model a geological volume. Provided herein below are example variables that may be provided and examples of role players who may provide such information. One example is rock mass quality, which may be provided by, for example, a geotechnical engineer. Another example is rock faulting and rock joint geometries and smoothness/roughness, which may be provided by a geotechnical engineer or geologist. Stope and ore block geometries may include a height of stope, a span of a designed stope, surface area to volume ratio, local hanging wall angle, and/or local footwall, and may be provided by a mine planning engineer. Another example of a variable is a blast hole design geometry and pattern, which may be provided by a mine planning engineer. Exemplary variables also include blast charging powder factor and blast sequencing, which may be provided by a mine planning engineer; ore mineralization values and rock specific gravity values, which may be provided by a geologist; and post-mining cavity survey, which may be provided by a surveyor and/or a mine planning engineer.

The factors are used to determine the mining confidence, i.e., the degree of support for the hypotheses, that units of rock will be mined or not mined. These units of rock may be inside of the stope (or designed ore block) or outside of the stope. By considering such factors from the various role players, embodiments integrate the disaggregated and dispersed expert knowledge and understanding into a single harmonized modeling representation. Moreover, embodiments allow for the automatic calculation and expression of confidence levels that the mineable unit is mined or not mined, along with ore values expressed in mass and grade terms. Further, the unified modeling representation generated by embodiments allows for a planning engineer to visually identify, in a graphical user interface, sub-optimal stope and drill-and-blast design and correct the design before undertaking rock-drilling and rock blasting.

As described herein, embodiments rely on data fusion. Data fusion methods comprise a family of methods. There are several definitions of what data fusion encompasses because data fusion comprises a number of methods and a number of application areas. A summary of definitions is provided by Bostrom, the International Society of Information Fusion at http://www.isif.org/sites/isif.org/files/FULLTEXT01.pdf, the contents of which are incorporated by reference herein. Bostrom postulates an embracing definition at the end of his review. This definition is suitable for describing the use of data fusion employed in embodiments of the invention. Embodiments of the invention may use Bayesian probabilistic methods and Dempster-Shafer Belief Theory, amongst others. In Koks, D. and Challa, S. *An Introduction to Bayesian and Dempster-Shafer Data Fusion* available at http://www.dsto.defence.gov.au/publications/2563/DSTO-TR-1436.pdf the contents of which are incorporated herein by reference, both methods are described in relation to examples of sensor data fusion (radar tracking of military aircraft). In brief, Bayesian methods are concerned with probabilities of an event occurring and the probability can be modified by other events having occurred. Dempster-Shafer, which measures belief, is similar in many ways to probability, but allows for a lack of knowledge in the system, i.e., ignorance. By leveraging such techniques, embodiments can determine an analysis confidence.

Figure 2:
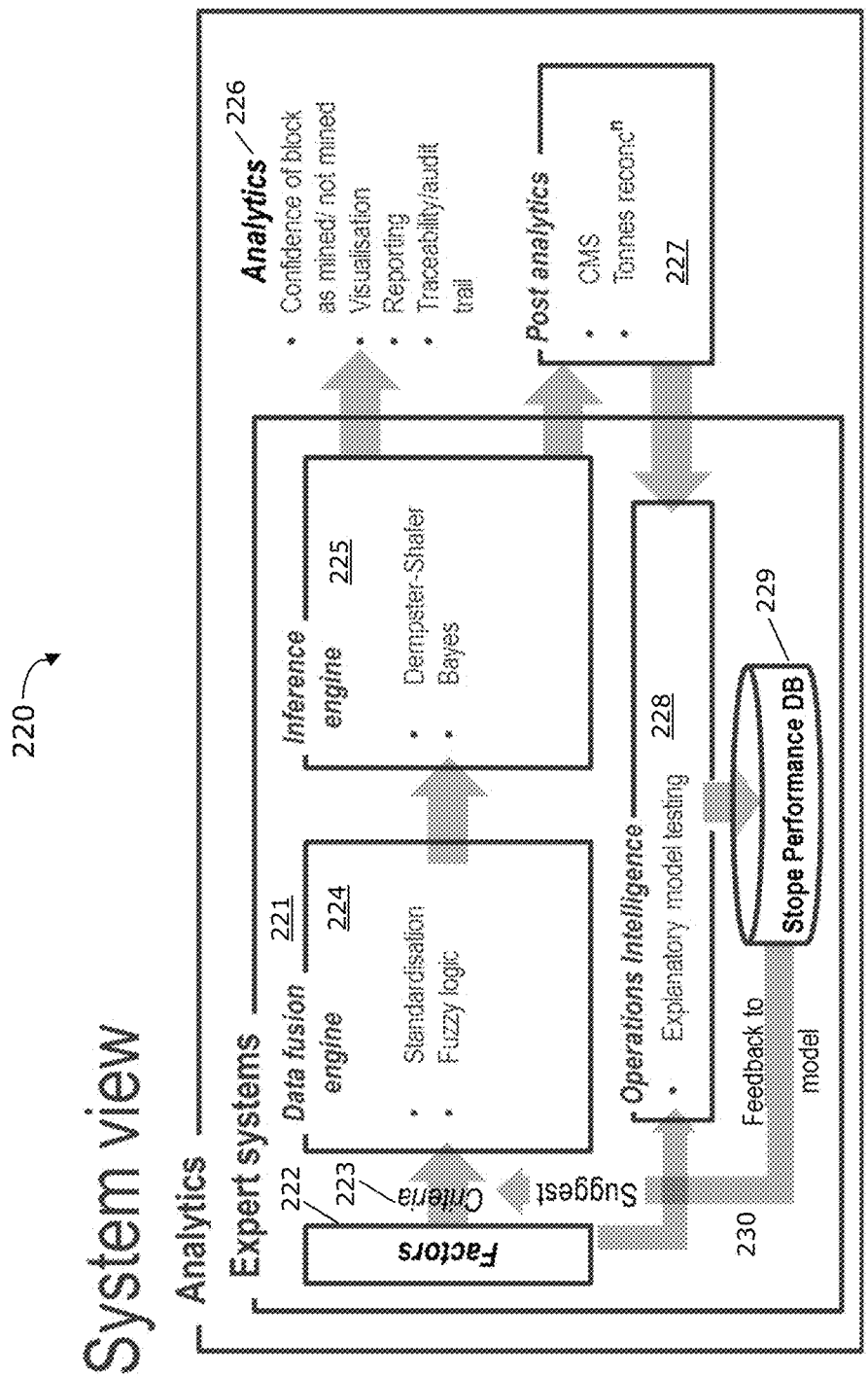
FIG. 2 is a simplified block diagram of a system and data flow therein according to an embodiment.

FIG. 2 is a simplified block diagram of a system 220 for modeling a geological volume. The system 220 includes the expert systems 221 which generate resulting analytics 226 and post-analytics 227 that incorporate the outputs from the expert systems 221 and inputs from at least one of: a digital file resulting from a cavity monitoring system device or other surveyed mass and volume information. The expert systems 221 may function according to the system 100 described herein above in relation to FIG. 1. The expert systems 221 include a factors/variable module 222 for determining or receiving any number of variables that are relevant to the analysis being performed. The factors module 222 may obtain such data from various roles, for example through communication via any means known in the art. The factors are included in a model of the geological volume by the factors module 222. After identifying the factors 222, respective criteria 223 are assigned to each factor. The criteria 223 indicate the influence of each factor 222 on the analysis. The criteria mathematical expressions 223 may be supplied by various role players, for example, at the time the factors 222 are provided. The criteria mathematical expressions 223 may also be determined and suggested by the factors module 222 to the roles. These suggested criteria may be based upon past simulations. The weight values for each of the factors contributing to the degree of support for the hypotheses mined and hypotheses not mined are provided by the roles into the module 222, and the sum value for the weights of each hypothesis is 1.0.

In response to assigning the criteria to the factors, a data fusion engine 224, which is operatively coupled to the factors module 222, processes the factors 222 and criteria 223 to harmonize the factors 222 and their associated criteria 223 mathematical expressions. The data fusion engine 224 may perform this harmonization/standardization using linear scale transformation methods, which are mathematical methods to transform the factor value numeric ranges to be between 0.0 and 1.0, or by the assignment of classification values provided by the roles (for example where a geotechnical engineer may apply a rock quality between 0.1 and 1.0 based on a nominal assignment).

The data fusion engine 224 allows variables deemed by the roles to be suitable for aggregations to be aggregated to a new variable by fuzzy logic, fuzzy(OR) so that the factor having the greatest influence of the aggregated factors is presented to the inference engine 225 in a single new variable. For example, where the role is a geotechnical engineer, and the geotechnical engineer chooses to simulate multiple geological faults, each may be simulated in a different variable in the factors module 222. In this example, the role player may decide that only the geological fault with the most influence (the highest standardized value for the said volume unit) should be presented to the inference engine 225. By applying FuzzyOR(fault_a, fault_b, fault_n) into a new variable the fault data is aggregated for presentation to the inference engine 225.

An inference engine 225 is communicatively coupled to the data fusion engine 224. The inference engine 225 processes the standardized data from the data fusion engine 224 and produces the analytics 226. The inference engine 225 performs the processing using known techniques such as Dempster-Shafer and/or Bayesian probabilistic methods. The resulting analytics 226 are specific to the analysis being performed. For example, the system 220 determines the mining confidence, i.e., whether or not sub-volumes of a stope will be mined. Thus, the analytics 226 include the confidence of blocks as mined or not mined, a visualization of the confidence, reporting, and a traceability and audit trail. The resulting analytics 226 provide a model including the sub-volumes with the additional data of whether the sub-volumes will be mined. The system 220 may also record a list of instructions and values presented to it by the roles, automatically creating an audit trail of who (the role), what (the factors and criteria), and when (the time of transaction) for the simulations.

In the embodiment 220, the inference engine 225 also incorporates an interface module (not shown) for post analytics 227, where post-mining values can be incorporated into the results of the system 220. Example post-mining data values include the as-mined cavity mine survey (a spatial survey by a laser scanning device) and reconciled tons data, both of which may be input to the system 220. The post analytics module 227 may determine the minimum euclidean distance between the post-mining stope surface and the stope design surface (spatial deviation) for each model voxel contained with the spatial intersection of the aforementioned surfaces. The minimum euclidean distances represent the response variable values utilized in the operations intelligence module 228 of the system 220. The post analytics 227 are provided as feedback to the operations intelligence module 228. The operations intelligence module 228 tests the determined model that includes, in this example, all of the factors 222. The operations intelligence module 228 utilizes regression analysis to test the explanatory potential of each of the factors toward the response variable. The operation intelligence module 228 further stores the factor parameters, including name and location identifiers for each, and the mathematical model resulting from the regression analysis in a stope performance database 229. Data from the stope performance database 229 may be provided as feedback 230, to determine, for example, the criteria 223 to be assigned or suggested via a prompt to the user in subsequent stope simulations.

Figure 3:
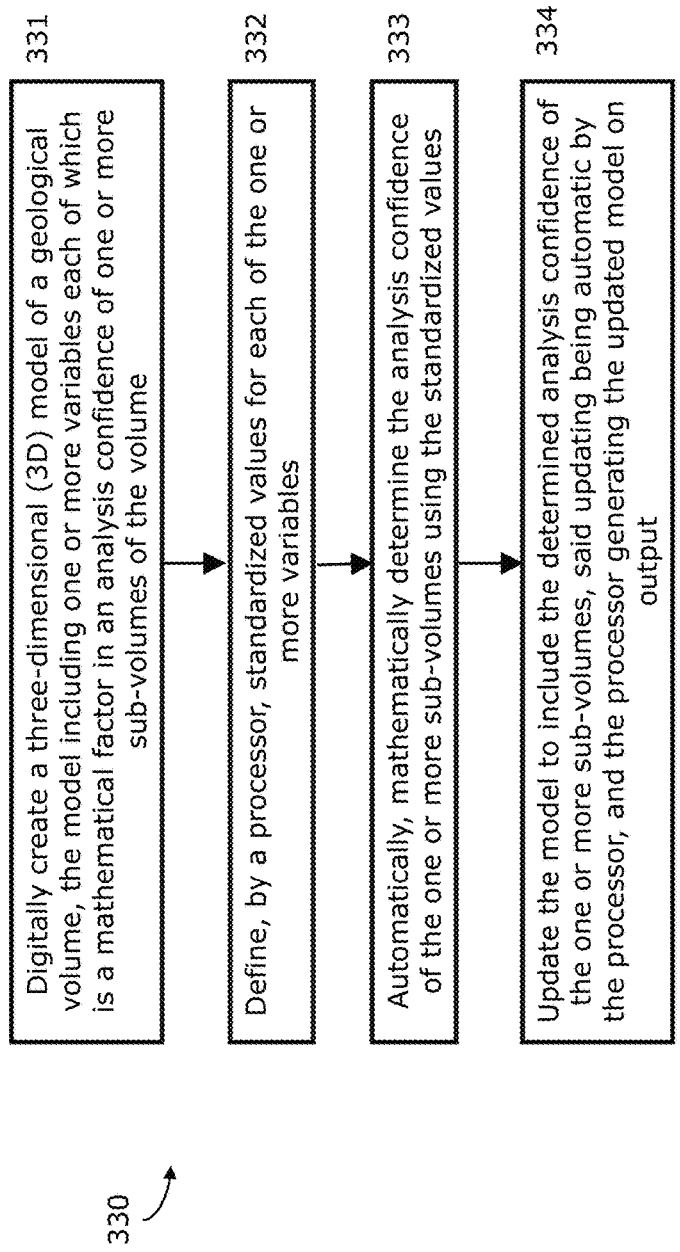
FIG. 3 is a flowchart of a method for modeling a geological volume according to the principles of the present invention.

FIG. 3 is a flow diagram of a method 330 for modeling a proposed geological volume, for example, a stope. The method 330 begins by digitally creating a 3D model of a geological volume (331). The 3D model includes one or more variables that are each a mathematical factor in an analysis confidence of one or more sub-volumes of the volume to be mined. In other words, the variables have an effect on an analysis that is performed by the method 330. The volume created at step 331 may be a 3D voxel model. For example, the volume may be a high-resolution 3D spatial and attribute model (block model voxels) that spatially encompasses the design volume. Moreover, creating the model 331 may further include creating the variables. The variables included in the model may be supplied by various roles as described herein. Creating a model 331 may further include assigning respective criteria to each of the one or more variables. In such an embodiment, the respective criteria together with a weight, express the influence of the corresponding variable on the analysis confidence. For example, a geological fault may, in the professional and domain experience of the geotechnical engineer, contribute to the hypothesis_mined by the degree of rock jointing and stress. This contribution can be expressed by the geotechnical engineer as a mathematical expression which puts the highest effect on sub-volume units in close proximity to the fault and the lowest effect on sub-volume units furthest from the fault.

After creating the model 331, the method 330 continues by defining standardized values for each of the one or more variables (332). Defining the standardized values thus harmonizes the multiple variables that affect the analysis confidence. Defining the standardized values may be accomplished by linear scale transformation methods including but not limited to the score range method. The method 330 then determines the analysis confidence of the one or more sub-volumes using the standardized values (333). The analysis confidence may be determined using methods known in the art, for example, by employing inference algorithms. Determining the analysis confidence (333) may comprise using at least one of Dempster-Shafer Belief Theory, Bayesian probabilistic methods, weights-of-evidence methods, and fuzzy logic methods.

Finally, the method 330 concludes by updating the model created at step 331 to include the determined analysis confidence of the one or more sub-volumes (334). In such an embodiment, the updating (334) may be automatic by a processor and the processor may generate the updated model on output.

An embodiment of the method 330 further includes assigning a respective weight to the standardized values. In such an embodiment, the weights indicate an effect of each respective standardized value on the analysis confidence. These weights may be determined from previous analyses, expert (role) input, or some combination thereof. Moreover, defining the standardized values (332) may consider the assigned weights along with the criteria.

Yet another embodiment of the method 330 further comprises testing the contribution of the one or more variables using surveyed spatial deviations and explanatory variables. The surveyed spatial deviations result from the minimum euclidean distance between the post-mining stope surface and the stope design surface (spatial deviation) for each model voxel contained inside the spatial intersection of the aforementioned surfaces. In such an embodiment, the testing may be performed using generalized linear regression or other regression techniques where the surveyed spatial deviations are used as the response variable and the input variables are used as the explanatory variables. In such an embodiment, the testing may result in a mathematical model that describes the explanatory potential of the one or more variables. The mathematical model and the updated model may be combined so as to permit visual interpretation of deviations for patterns, clustering, regularity, and randomness.

Another embodiment of the method 330 includes visually rendering the updated model in a manner indicating the determined analysis confidence of the one or more sub-volumes. For example, a CAD model may be produced that depicts the stope and various sub-volumes thereof. The determined analysis confidence can be illustrated, for example, by shading, coloring, or labeling these sub-volumes and displaying this in a device.

Embodiments of the method 330 may store any of the data utilized or determined throughout the method 330. For example, the factors, criteria, mathematical model, and updated model may be stored in a non-spatial database as an audit record and as a learning database. Further still, an embodiment may store a regression model residual value for voxels into a high-resolution 3D spatial and attribute model to permit visual interpretation of the deviations for patterns, clustering, regularity, and randomness.

The method 330 and the various embodiments of the invention described herein provide numerous benefits for simulating geological volumes. For example, the method 330 and the various embodiments facilitate bringing together disaggregated data into one model environment; harmonizing the model environment in respect to units and scales; providing a means for visualizing and interpreting the data together; and modeling the blast design against the factors and making informed design changes before rock drilling to achieve less dilution, ore loss, and ineffective expenditure of resources. The method 330 and the various embodiments also facilitate modeling mineable ore quality mass/grades with multiple confidence intervals; allowing the customer (processing plant, head office) to access ore quality data/reports, especially reports stating confidences of outcomes; evaluating stope performance to update and improve the criteria for subsequent stope/bench designs; providing an automatic audit trail for use in a document control system; and accumulating knowledge by storage of results that allow learning.

Figure 4:
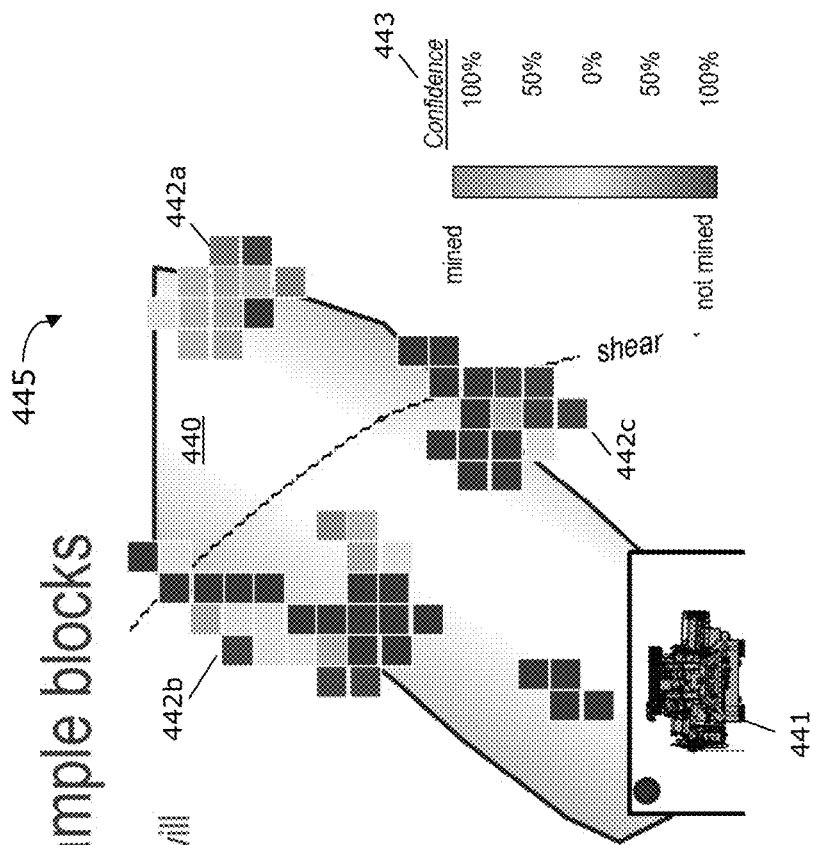
FIG. 4 illustrates a 3D model generated at output by an embodiment.

FIG. 4 is an example visualization (through a cross-section) 445 of a 3D stope model 440 showing some voxels (sub-volumes) 442a-c which may be produced by embodiments of the present invention, such as the method 330. FIG. 4 illustrates the stope 440 which may be mined by the equipment 441. The example depicted in FIG. 4 illustrates the determined confidence whether the sub-volumes, 442a-c, amongst others, of the stope 440 will be mined. After processing as described herein, the resulting visualization 445 illustrates, using the color coded scale 443, whether particular sub-volumes are mined or not. In this example, the darkest green indicates that a sub-volume will be mined and the darkest red indicates that a sub-volume will not be mined. Meanwhile, yellow indicates little to no confidence as to whether a sub-volume will be mined or not. Thus, by interpreting this visualization 445, one may examine and adjust the mining plan to minimize the unknown, i.e., the yellow sub-volumes.

In addition to a visualization, such as the visualization 445 depicted in FIG. 4, embodiments may also provide reports.

One such example report 550 is depicted in FIG. 5. In the report 550 the mineable ore to be produced from a stope is grouped by confidence band 551. This reporting may be generated using existing report generation techniques available in CAD/GMP software.

Figure 6:
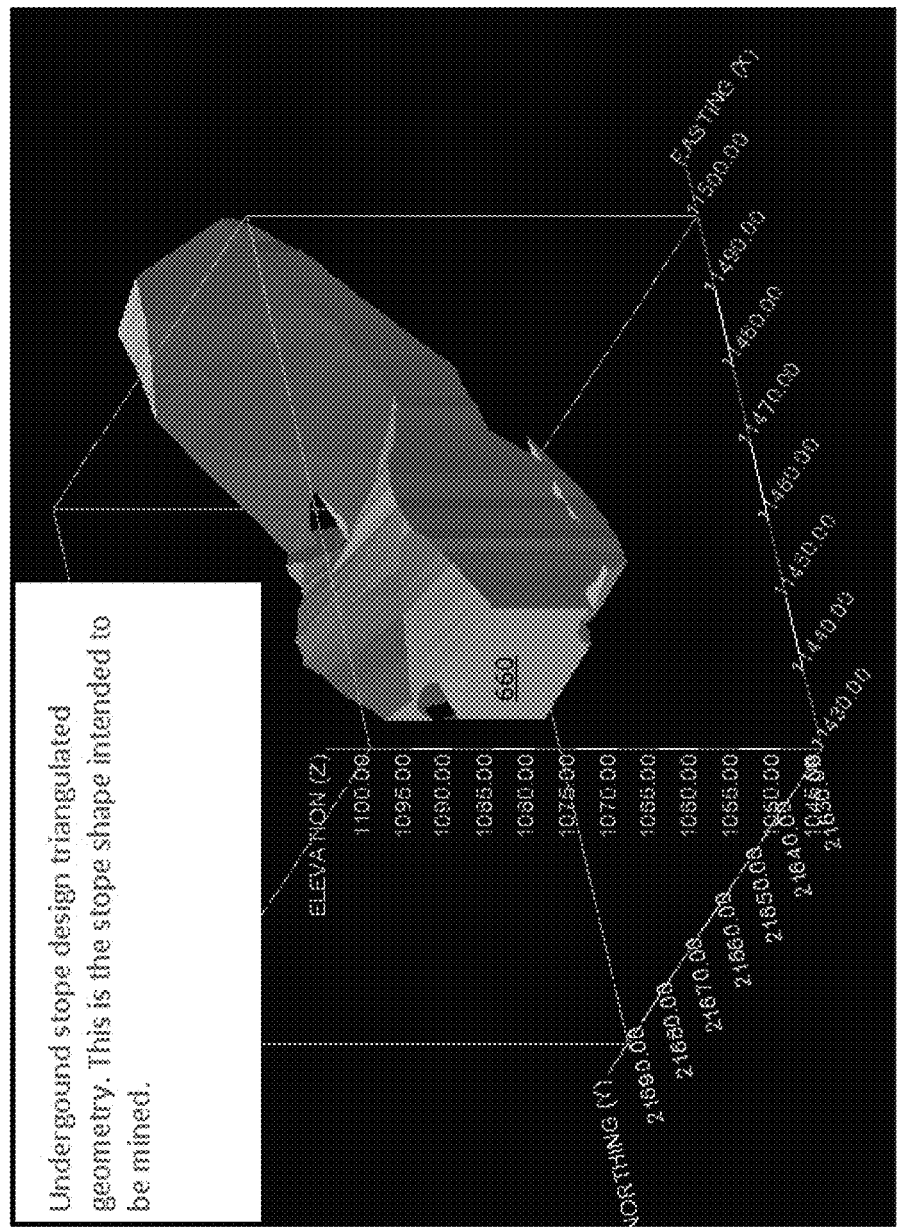
FIG. 6 depicts a 3D model of a geological volume that may be employed in embodiments of the invention.
Figure 7:
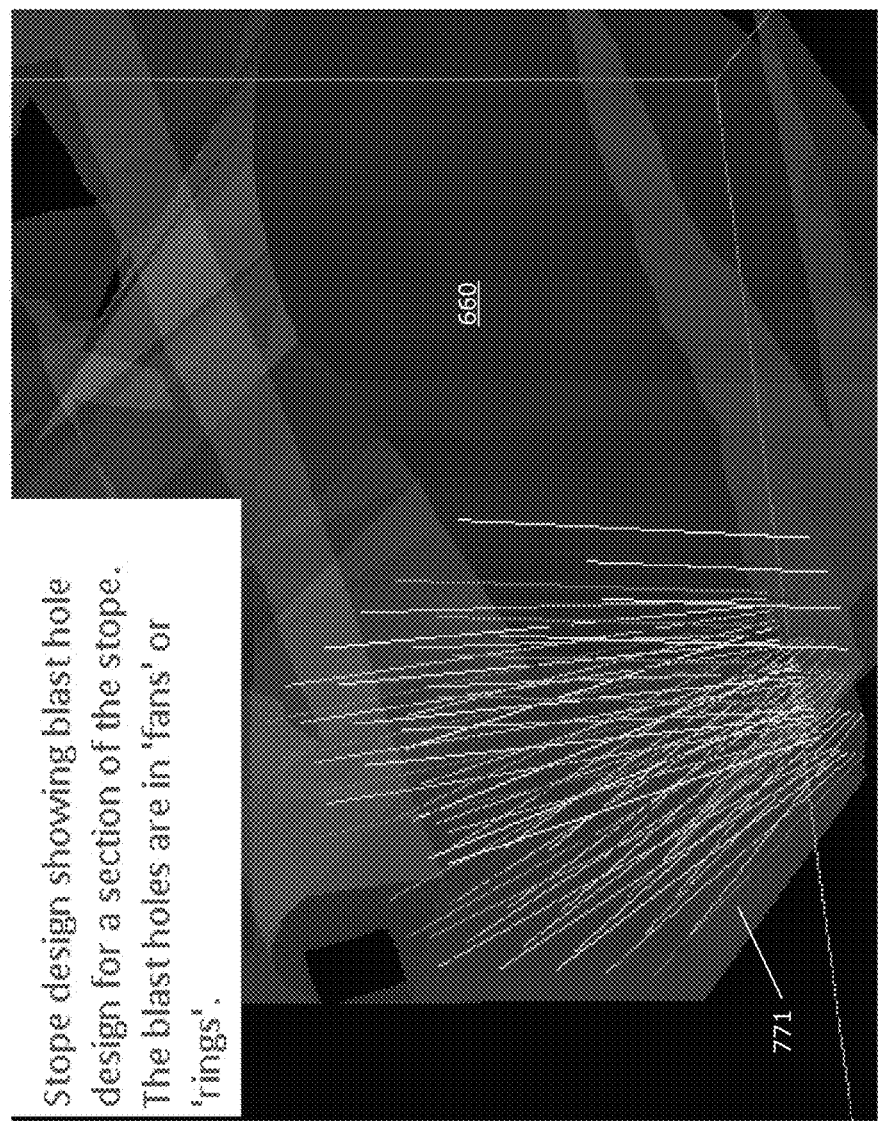
FIG. 7 depicts a 3D model of a geological volume with blast hole designs that may be employed in an embodiment of the invention.
Figure 8:
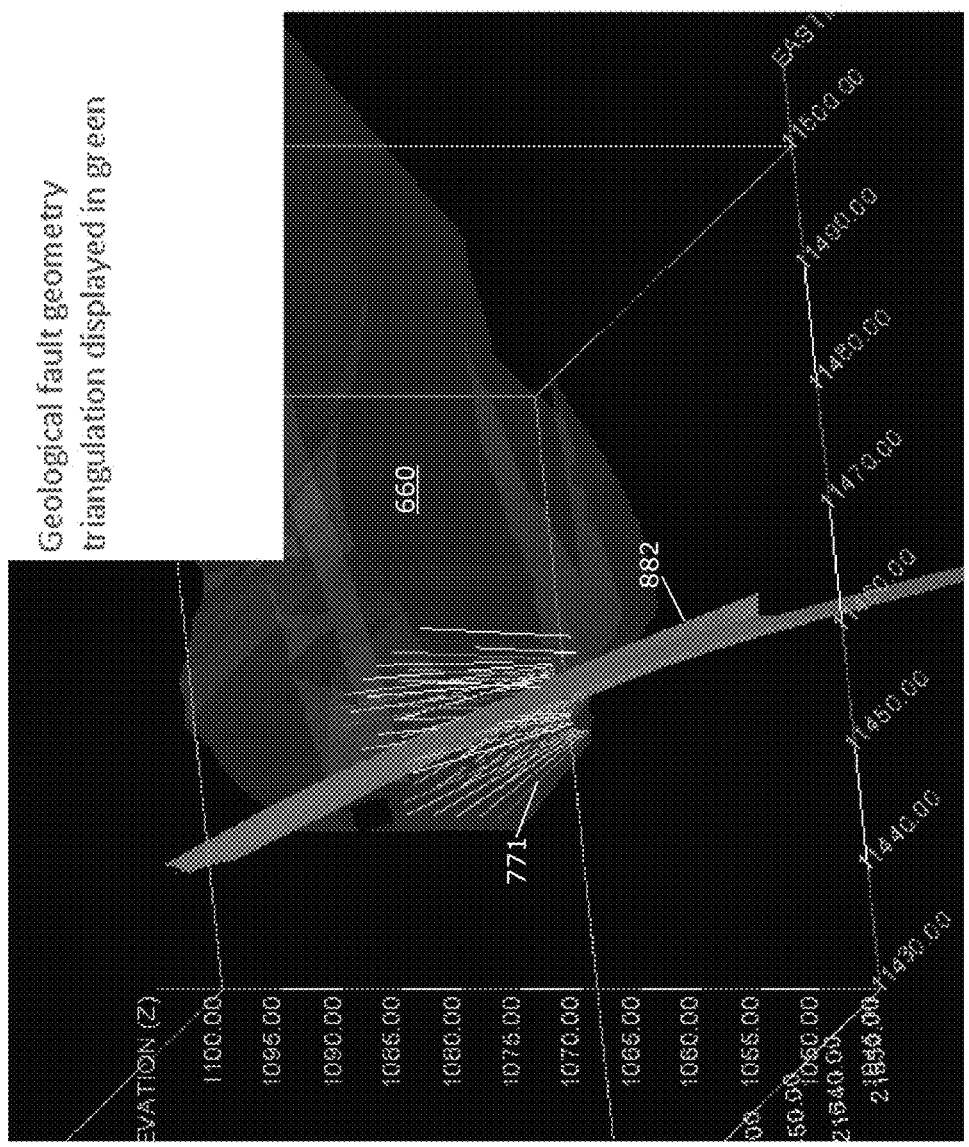
FIG. 8 illustrates the 3D model of FIG. 7 along with a geological fault.

FIG. 6 depicts a 3D stope design 660 that may be created, for example, at step 331 of the method 330. The stope design 660 shows the geometry mesh of the stope design (shape intended to be mined). This stope design 660 may be generated using existing CAD packages and/or specific geology mine planning software that is available. FIG. 7 depicts the stope design 660 along with the geometry lines (strings) of the blast hole design 771. This stope design 660 and blast hole design 771 may be utilized in embodiments of the invention. For example, in an embodiment, the blast hole design 771 may be a variable that effects the analysis confidence and that is included in the 3D stope design 660. FIG. 8 depicts the stope design 660 and blast hole design 771 along with the geological fault geometry triangulation 882. The fault geometry 882 may be a variable that affects the analysis confidence in an example embodiment.

Figure 9:
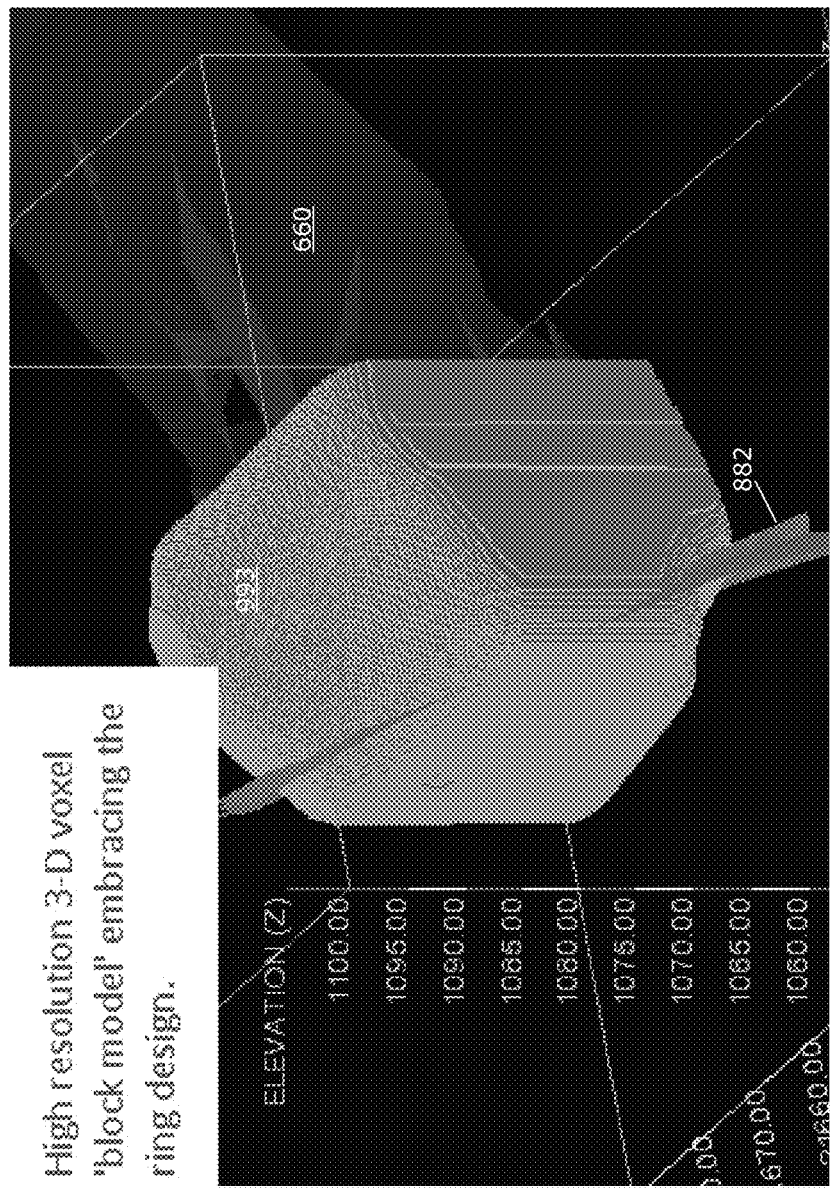
FIG. 9 is an illustration of a high-resolution 3D model of a geological volume with a fault that may be utilized in embodiments of the present invention.

FIG. 9 illustrates a 3D CAD model of the stope design created from a triangulated mesh prior to importation with the high resolution voxel model 993 of the stope design 660 that embraces the ring design of the blast hole design 771 displayed in FIG. 7 and further includes the fault geometry 882. The representation shown in pink in FIG. 9 indicates the voxel sub-volumes embracing the designed blast holes 771. The stope design 660 depicted may be used in embodiments for the calculation of factors including the euclidean distance from the voxel to the stope wall, and the angle of repose of the stope wall (hanging wall, foot wall, roof, and floor). Further, the stope design 660 may be used in the calculation of the spatial deviations.

Figure 10:
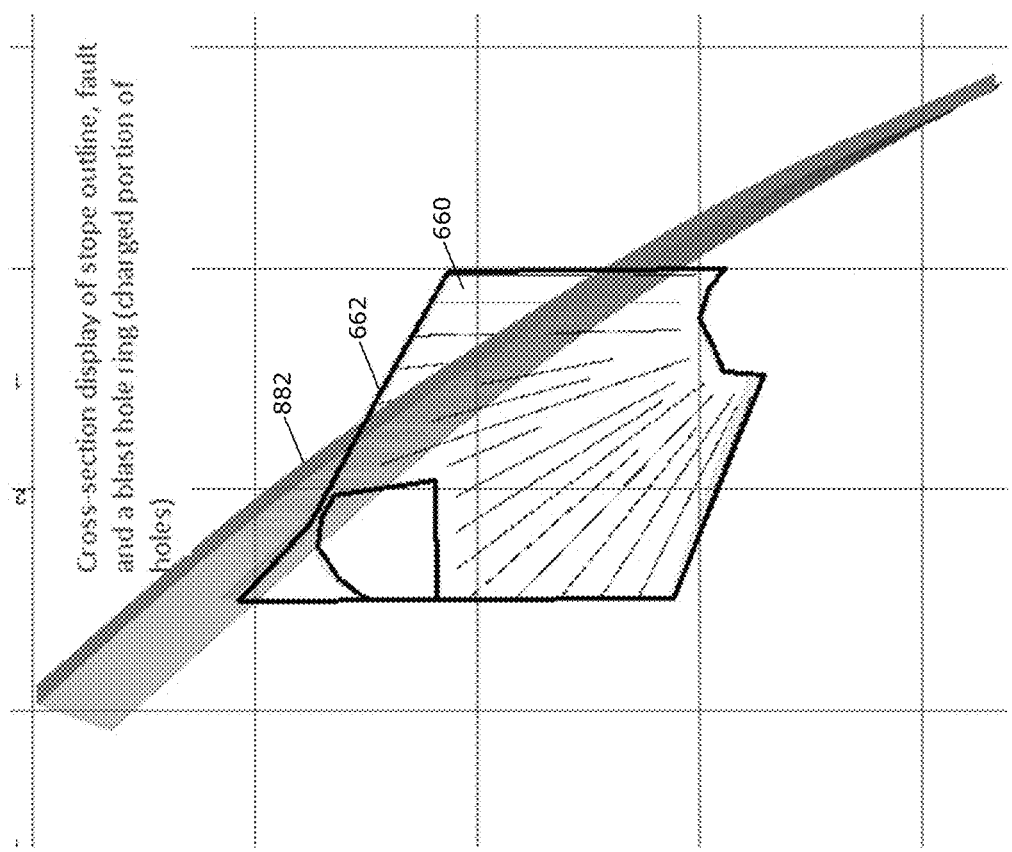
FIG. 10 depicts a cross section of a geological volume with a geological fault and blast holes.

FIG. 10 depicts a cross-section outline 662 of the stope design 660 through a blast hole ring of the blast hole design 771. FIG. 10 further depicts the fault geometry 882. FIG. 10 shows the geometries of the structures giving context to the values represented as graduated colors in FIGS. 11-15. Specifically, FIG. 10 represents the section through the CAD geometries before being incorporated into the high resolution voxel model.

Figure 11:
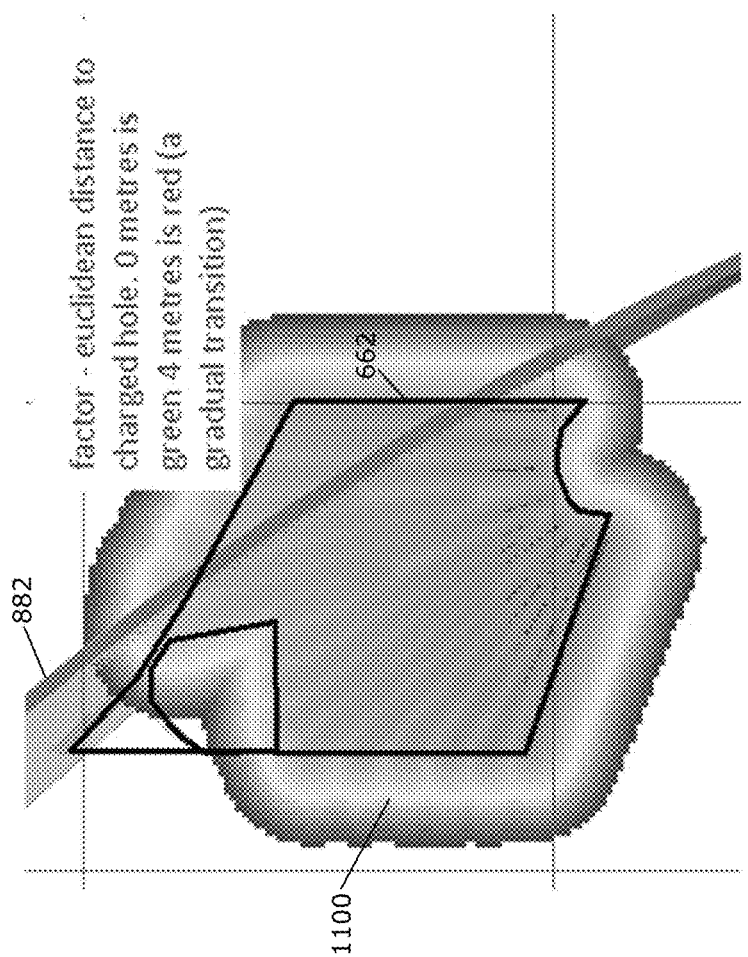
FIG. 11 depicts the distance from blast holes to various points in a geological volume using a color scale.
Figure 12:
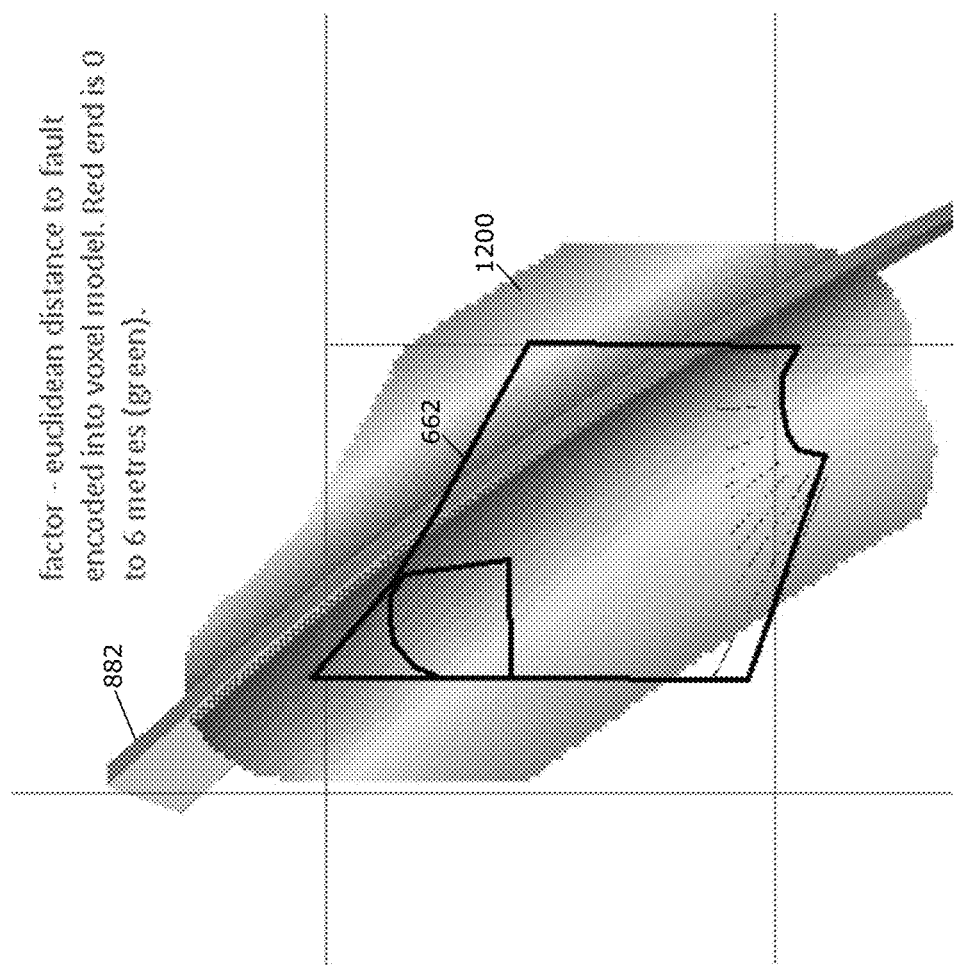
FIG. 12 depicts the distance from the geological fault to points in a geological volume using a color scale.

FIG. 11 is a graphical illustration 1100 of a variable in the high resolution voxel model, before standardization, that may be employed in an embodiment of the invention. FIG. 11 depicts the euclidean distance from voxel sub-volumes of the stope cross-section 662 to charged holes (in cross-sectional view). The distance in this example is illustrated by the color coding 1100 where green depicts portions of the stope that are approximately 0 meters from a charged hole and red depicts portions of the stope that are approximately 4 meters from a charged hole. Such data may be provided by various roles, for example via the factors module 222 of the system 220. FIG. 12 similarly illustrates another factor prior to standardization, euclidean distance from points in the cross section of the stope 662 to the fault geometry 882. This is shown in FIG. 12 by the color-coding 1200 where red is approximately 0 meters from the fault 882 and green is approximately 6 meters from the fault geometry 882.

Figure 13:
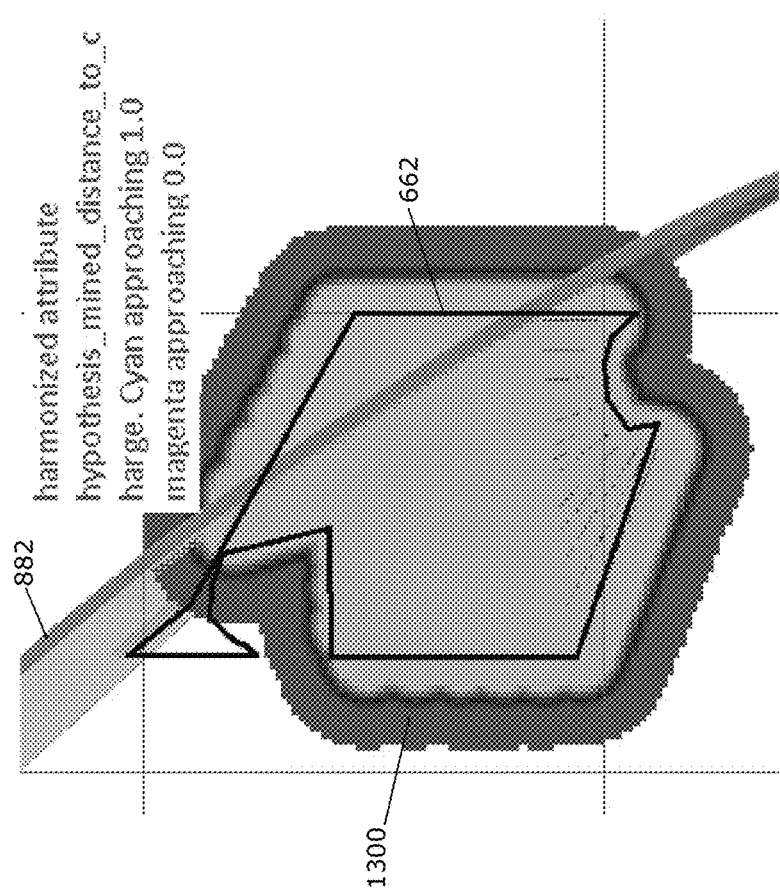
FIG. 13 illustrates a harmonized variable, distance to blast holes, that may be determined by an embodiment.
Figure 14:
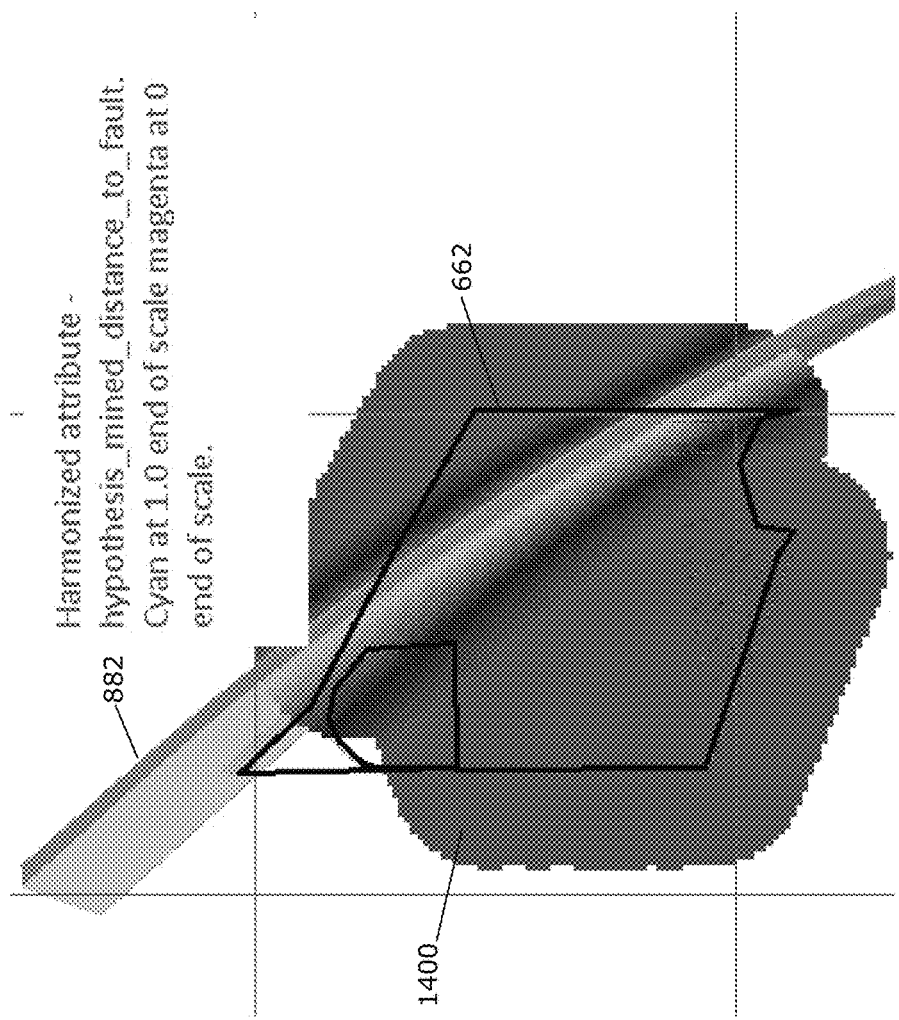
FIG. 14 illustrates a harmonized variable, distance to fault, that may be determined in an embodiment.

FIG. 13 depicts the factor illustrated in FIG. 11, euclidean distance from points in the stope to charged holes, after the factor has been harmonized as described herein. In FIG. 13 this harmonized data is illustrated by the color coding 1300 where the cyan is approaching 1 and the magenta is approaching 0. FIG. 14 similarly depicts the factor illustrated in FIG. 12 after such data has been harmonized. FIG. 14 depicts the variable of distance from points in the stope cross section 662 to the fault geometry 882 using the color coding 1400 where cyan is approaching 1 and magenta is approaching 0.

Figure 15:
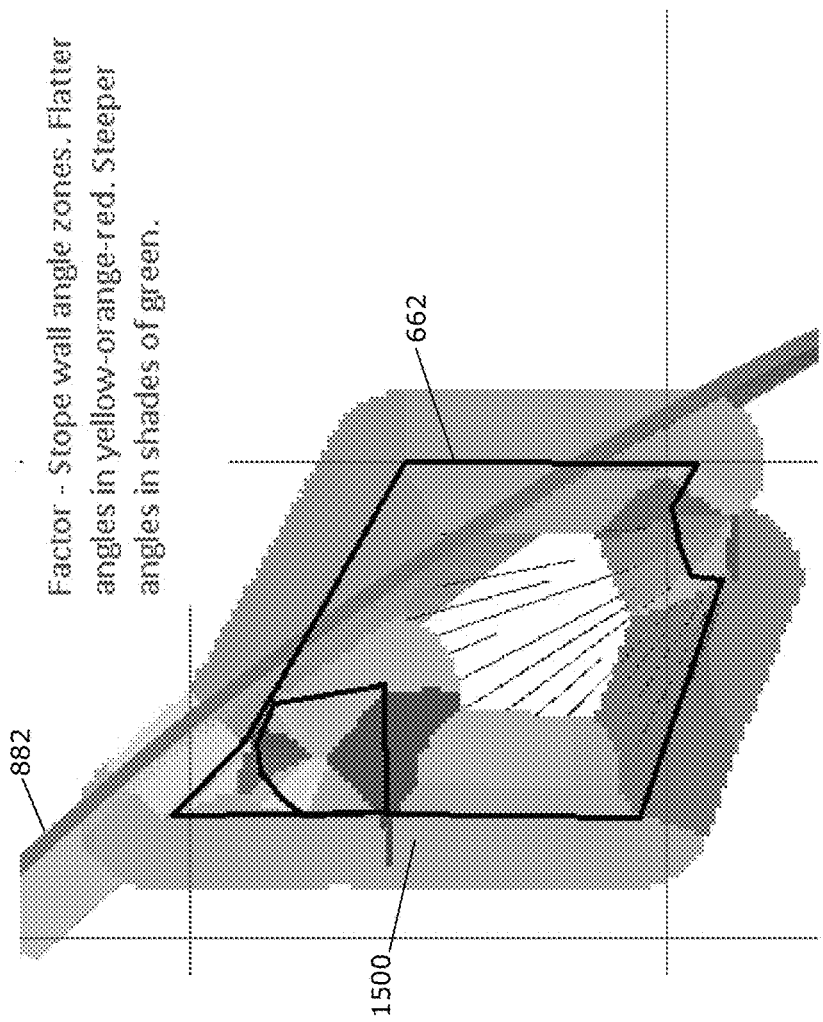
FIG. 15 is an example of a variable of a geological volume that may be utilized in an embodiment.

FIG. 15 depicts stope wall angle data of the stope cross section 662 which may be a factor in determining mining confidence in an embodiment of the invention. In FIG. 15 the color coding 1500 shows flatter angles in yellow-orange-red and steeper angles in shades of green.

Described herein below are the steps for an alternative embodiment of the invention. The various roles as described hereinabove provide data that is utilized in this embodiment. In such an example embodiment, the planning engineer, through an application user interface, creates a 3D octree voxel model (block model) of a stope or an open-pit bench to be modeled. The user interface includes a 3D graphical viewport, a tool panel/toolbars, and a panel tree view. The interactions by the role players via the user interface allows spatial coordinates and axis rotation, together with cell 'voxel' resolution to be entered. The spatial coordinate entry can be facilitated by the ability to interrogate minimum and maximum values from a stope design, geological fault, blast design, or other geometry file. The output of such an embodiment is the creation of an 'ore quality management' model for the stope/bench. The octree model may utilize known block model code libraries.

After the model creation, each role will assign or be assigned read/write privileges for the factors (variables) for which they are responsible. Thus, each role will create and name factor layers (attributes) for which they are responsible. Each layer may be derived from geometric data, in particular triangulated surface and solid files that can be read by the application using a file reading plugin library. Each factor layer is added to the system though a dialog, or tabbed browser page called the "Collection." The "Collection" will contain the library of data which is used by the system. This is needed because a single factor layer may be used by more than one role, and may contribute to criteria supporting more than one hypothesis.

Each role will apply the criteria to each factor through the graphical user interface. For example, if the factor is a geological fault, the geotechnical engineer enters criteria on the basis of his or her domain knowledge. An example of criteria may be for a factor that requires the distance from the voxel to a triangulated surface or solid. In such an example, if the block is within 2.5 meters of the hanging wall surface of the stope, the effect of the euclidean distance on the analysis is 1.0 else, if the block is less than 1.5 meters from the fault, the effect on the analysis is 0.8 else, if the block is between 2.5 meters and 1.5 meters from the hanging wall surface then the value is computed using the linear scale transformation. For factors that are of a nominal data scale, such as the assignment of a standardized value for a factor such as rock type where the geotechnical engineer might have categories such as 'very competent, competent, medium competence, low competence, very low competence' the graphical user interface will provide a means for the role to assign values for the nominal categories (the application of the criteria to the factor). The value assignments being constrained to be between 0 and 1.0

The interface at this point of the workflow will show all of the factors, which are visible to all of the roles. However, each role may only have write access to the factors for which they are responsible. Once all of the factor layers are populated, and the criteria and weights are added, then the planning engineer role can proceed to harmonize (or standardize) the factor layers. This may be done through use of a fusion engine as described herein. Note that when this is done, the original factor layers need not be altered, but new layers for the standardized factors can be created. The standardization methods use the common "maximum score" or "score range" methods and create values in the range of $0<=X<=1$.

The roles will be able to inspect the standardized attributes in the graphical user interface of the 3D graphical viewport. In the graphical user interface, the planning engineer will click a button or a menu item to commence the calculation of support for the hypothesis_mined and hypothesis_not_mined (analysis confidence). This creates new layers (attributes) in the octree model. In the case of the Dempster-Shafer Belief Theory method the new attributes are: mined_belief (the total hard evidence in support of the hypothesis_mined); mined_disbelief (the degree of support for all hypotheses not explicitly defined in the belief); mined_plausiblity (indicates volumetric blocks where the conditions are likely to favor the hypothesis_mined despite a lack of hard evidence for such); and mined_belief_interval (the range between mined_plausiblity and mined_belief that is indicative of the degree that the factors and criteria support the mined_belief hypothesis). Note that Dempster-Shafer Belief Theory and Bayesian probabilistic methods may be used by this embodiment.

After calculating the analysis confidence, the planning engineer and other roles can inspect the mined_belief and mined_belief_interval attributes in the 3D graphical user interface. Using a color coding scheme for rendering values, the volumes of mined_belief_interval can be inspected in the graphical visualizer. For example, a 3D model of the stope that depicts that depicts the determined analysis confidence via color-coding can be displayed in the graphical user interface. The planning engineer can directly interpret the mined_belief_interval to identify locations in the stope design which should be modified prior to committing to rock drilling the stope. At this point all of the roles see one version of the simulation based upon the information and criteria provided by them.

Reports can be generated from the model by querying confidence level attributes contained within the octree block-model. An example report 550 is illustrated in FIG. 5.

After the mining of the underground stope has been completed the common practice in the mining underground mining industry is to conduct a stope survey. The void space is surveyed by the mine surveyor using a cavity monitoring system device. The survey results can be output to a 3D geometry format. The data in the survey data file can be added to the model as a new layer by the planning engineer and a new factor attribute can be computed which holds the euclidean distance offsets between the designed stope surface and the as surveyed stope surface.

With this updated model, the planning engineer can invoke the post mining analytics to test the explanatory potential of each of the original factors on the mined outcome by statistical regression analysis. An example of a module for performing this analysis is the operations intelligence module 228 shown in FIG. 2. For each block between the designed geometry surface and the as mined surface, logic and statistical regression analysis can be performed to calculate the explanatory model. Embodiments may utilize operations intelligence libraries or custom generalized linear regression models (unique single use libraries) to perform this analysis. The aforementioned embodiment may also automatically store factors, criteria, roles, reports, and the explanatory model into a database for the audit record and learning.

Figure 16:
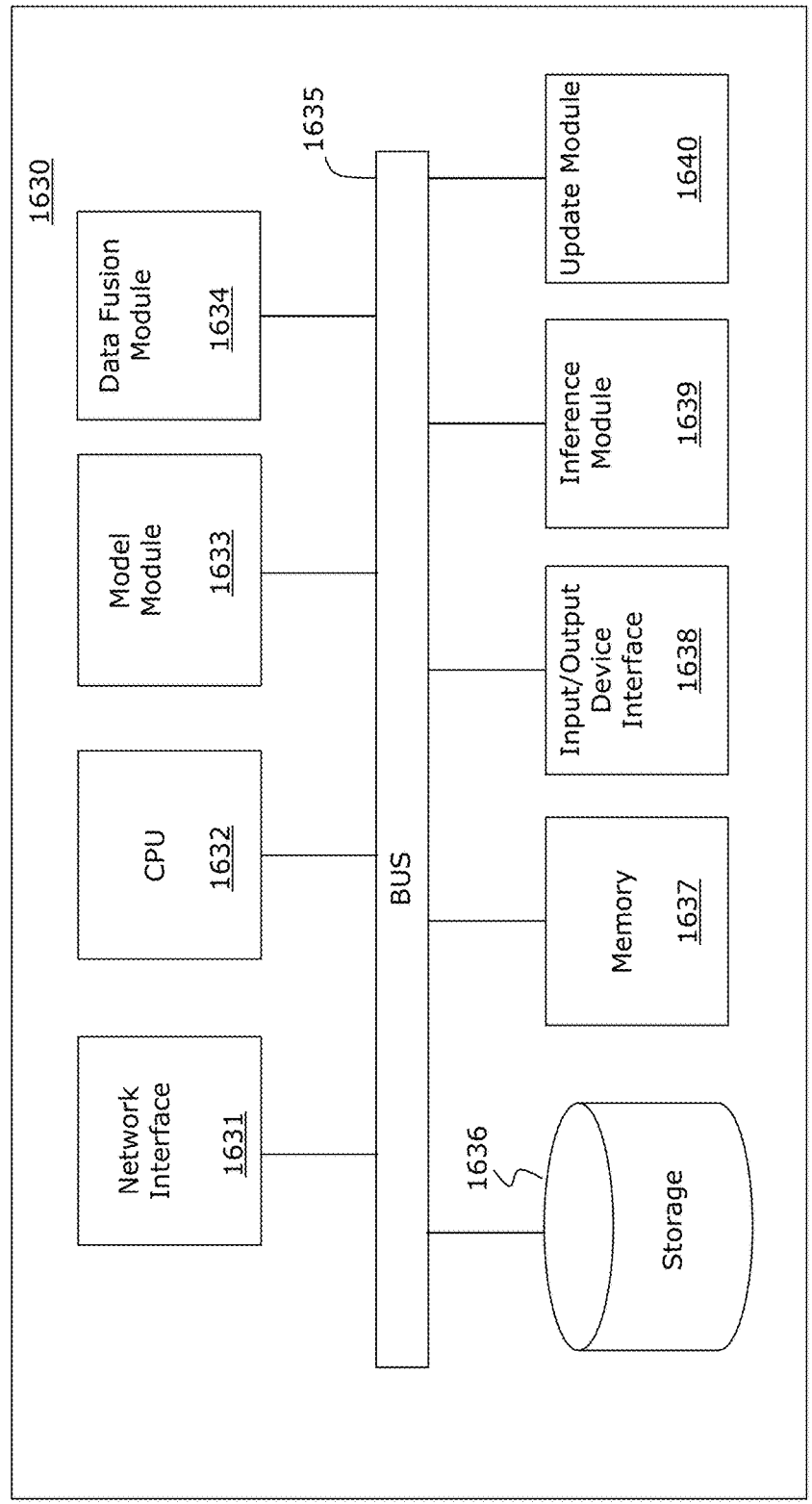
FIG. 16 is a simplified block diagram of a system for modeling a proposed geological volume according to an embodiment.

FIG. 16 is a simplified block diagram of a computer-based system 1630 that may be used to model a proposed geological volume according to an embodiment of the present invention. The system 1630 comprises a bus 1635. The bus 1635 serves as an interconnect between the various components of the system 1630. Connected to the bus 1635 is an input/output device interface 1638 for connecting various input and output devices such as a keyboard, mouse, display, speakers, etc. to the system 1630. A central processing unit (CPU) 1632 is connected to the bus 1635 and provides for the execution of computer instructions. Memory 1637 provides volatile storage for data used for carrying out computer instructions. Storage 1636 provides non-volatile storage for software instructions, such as an operating system (not shown). The system 1630 also comprises a network interface 1631 for connecting to any variety of networks known in the art, including wide area networks (WANs) and local area networks (LANs).

A model module 1633 is further connected to the bus 1635. The model module 1633 is configured to create a 3D model of a geological volume, the created model including one or more variables each of which is a mathematical factor in an analysis confidence of one or more sub-volumes of the geological volume. A data fusion module 1634 is communicatively coupled, via the bus 1635, to the model module 1633. The data fusion module 1634 is configured to define, using one or more processors, such as the CPU 1632, standardized values for each of the one or more variables. The system 1630 further includes an inference module 1639. The inference module 1639 is configured to automatically determine the analysis confidence of the one or more sub-volumes using the standardized values determined by the data fusion module 1634. Moreover, the system 1630 includes an update module 1640 configured to update the model to include the determined analysis confidence of the one or more sub-volumes.

It should be understood that the example embodiments described herein may be implemented in many different ways. In some instances, the various methods and machines described herein may each be implemented by a physical, virtual, or hybrid general purpose computer, such as the computer system 1630, or a computer network environment such as the computer environment 1700, described herein below in relation to FIG. 17. The computer system 1630 may be transformed into the machines that execute the methods described herein, for example, by loading software instructions into either memory 1637 or non-volatile storage 1636 for execution by the CPU 1632. Further, while the model module 1633, data fusion module 1634, inference module 1639, and update module 1640 are shown as separate modules, in an example embodiment, these modules may be implemented using a variety of configurations. One of ordinary skill should further understand that the system 1630 and its various components may be configured to carry out any embodiments of the present invention described herein.

Figure 17:
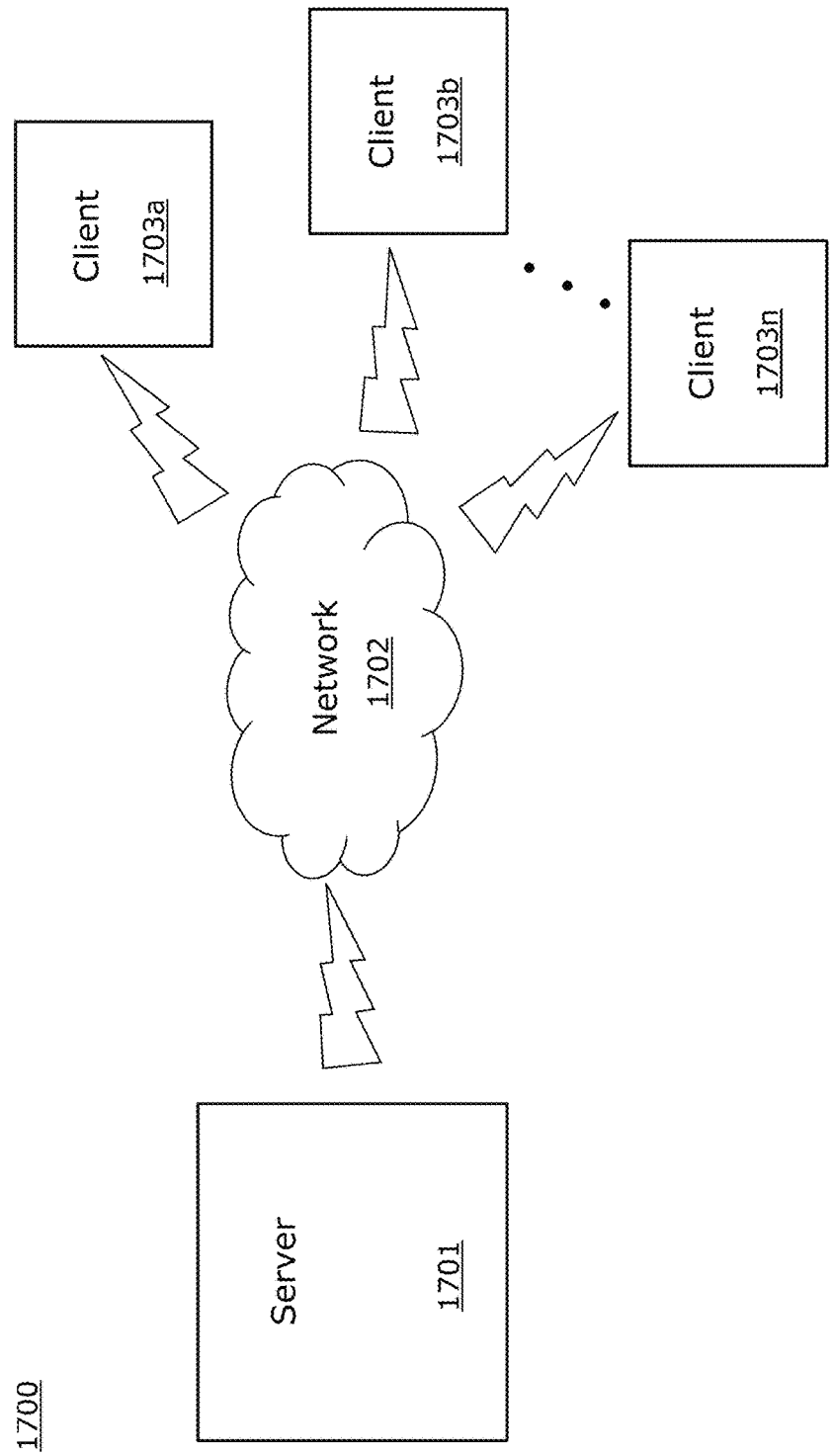
FIG. 17 is a simplified diagram of a computer network environment in which an embodiment of the present invention may be implemented.

FIG. 17 illustrates a computer network environment 1700 in which an embodiment of the present invention may be implemented. In the computer network environment 1700, the server 1701 is linked through the communications network 1702 to the clients 1703*a-n*. The environment 1700 may be used to allow the clients 1703*a-n*, alone or in combination with the server 1701, to execute any of the methods described herein above.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method for modeling a proposed geological volume, the method comprising:
   digitally creating a three-dimensional (3D) model of a geological volume, the model including one or more variables each of which is a mathematical factor in an analysis confidence interval of one or more sub-volumes of the volume, the analysis confidence interval being a mining confidence interval;
   defining, by a processor, standardized values for each of the one or more variables;
   automatically, mathematically determining the analysis confidence interval of the one or more sub-volumes using the standardized values; and
   updating the model to include the determined analysis confidence interval of the one or more sub-volumes by determining a minimum Euclidian distance for each voxel of the model contained with a spatial intersection, said updating being automatic by the processor, and the processor generating the updated model on output.

2. The method of claim 1 wherein the model of the geological volume represents at least one of a stope and an open-pit bench.

3. The method of claim 1 further comprising:
   assigning respective criteria to each of the one or more variables, the respective criteria expressing influence of the corresponding one or more variables on the analysis confidence interval.

4. The method of claim 1 further comprising:
   assigning a respective weight to the standardized values, the weight indicating an effect of each respective standardized value on the analysis confidence interval.

5. The method of claim 1 wherein determining the analysis confidence interval comprises using at least one of Dempster-Shafer Belief Theory, Bayesian probabilistic methods, Weights-of-Evidence methods, and Fuzzy logic methods.

6. The method of claim 1 further comprising:
   testing contribution of the one or more variables using surveyed spatial deviations and explanatory variables, the testing resulting in a mathematical model describing explanatory potential of the one or more variables.

7. The method of claim 6 further comprising:
   combining the mathematical model with the updated model so as to permit visual interpretation of deviations for patterns, clustering, regularity, and randomness.

8. The method of claim 1 further comprising:
   visually rendering the updated model in a manner indicating the determined analysis confidence interval of the one or more sub-volumes.

9. The method of claim 1 wherein the variables are provided by at least one of: a planning engineer, a geotechnical engineer, and a geologist.

10. A computer-based system for modeling a proposed geological volume, the system comprising:
    a processor; and
    a memory with computer code instructions stored therein, the memory operatively coupled to said processor such that the computer code instructions configure the processor to implement:
    a model module executable by one or more processors and configured to create a three-dimensional (3D) model of a geological volume, the model including one or more variables each of which is a mathematical factor in an analysis confidence interval of one or more sub-volumes, the analysis confidence interval being a mining confidence interval;
    a data fusion module communicatively coupled to the model module and configured to define, by the one or more processors, standardized values for each of the one or more variables;
    an inference module responsive to the data fusion module and configured to automatically, mathematically determine the analysis confidence interval of the one or more sub-volumes using the standardized values; and
    an update module operatively coupled between the model module and the inference module by determining a minimum Euclidian distance for each voxel of the model contained with a spatial intersection, the update module executable by the one of the processors and configured to automatically update the model to include the determined analysis confidence interval of the one or more sub-volumes, the update module generating the updated model on output.

11. The system of claim 10 wherein the model of the geological volume represents at least one of a stope and an open-pit bench.

12. The system of claim 10 wherein the model module is further configured to:
    assign respective criteria to each of the one or more variables, the respective criteria expressing influence of the corresponding one or more variables on the analysis confidence interval.

13. The system of claim 10 wherein the model module is further configured to:
    assign a respective weight to the standardized values, the weight indicating an effect of each respective standardized value on the analysis confidence interval.

14. The system of claim 10 wherein the inference module is configured to determine the analysis confidence interval using at least one of Dempster-Shafer Belief Theory, Bayesian probabilistic methods, Weights-of-Evidence methods, and Fuzzy logic methods.

15. The system of claim 10 further comprising a testing module configured to:
test contribution of the one or more variables using surveyed spatial deviations and explanatory variables, the testing resulting in a mathematical model describing explanatory potential of the one or more variables.

16. The system of claim 15 wherein the mathematical model is combined with the updated model so as to permit visual interpretation of deviations for patterns, clustering, regularity, and randomness via a display device operatively coupled to the system.

17. The system of claim 10 further configured to visually render the updated model in a manner indicating the determined analysis confidence interval of the one or more sub-volumes.

18. The system of claim 10 wherein the variables are provided by at least one of: a planning engineer, a geotechnical engineer, and a geologist.

19. A computer program product executed by a server in communication across a network with one or more clients, the computer program product comprising:
a non-transitory computer readable medium, the computer readable medium comprising program instructions which, when executed by a processor causes:
digitally creating a three-dimensional (3D) model of a geological volume, the model including one or more variables each of which is a mathematical factor in an analysis confidence interval of one or more sub-volumes of the volume, the analysis confidence interval being a mining confidence interval;
defining, by a processor, standardized values for each of the one or more variables;
automatically, mathematically determining the analysis confidence interval of the one or more sub-volumes using the standardized values; and
updating the model to include the determined analysis confidence interval of the one or more sub-volumes by determining a minimum Euclidian distance for each voxel of the model contained with a spatial intersection, said updating being automatic by the processor, and the processor generating the updated model on output.

* * * * *